United States Patent
Im et al.

(10) Patent No.: US 9,740,038 B2
(45) Date of Patent: Aug. 22, 2017

(54) CURVED LIQUID CRYSTAL DISPLAY DEVICE

(71) Applicant: Samsung Display Co., Ltd., Yongin-si (KR)

(72) Inventors: Wan-Soon Im, Cheonan-si (KR); Hyoung Cheol Lee, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/836,470

(22) Filed: Aug. 26, 2015

(65) Prior Publication Data

US 2016/0209713 A1    Jul. 21, 2016

(30) Foreign Application Priority Data

Jan. 20, 2015    (KR) .................. 10-2015-0009498

(51) Int. Cl.
    *G02F 1/1335*    (2006.01)
(52) U.S. Cl.
    CPC ............. *G02F 1/133514* (2013.01); *G02F 2001/133519* (2013.01)
(58) Field of Classification Search
    None
    See application file for complete search history.

(56) References Cited

U.S. PATENT DOCUMENTS

2008/0137013 A1    6/2008    Kamoshida
2011/0102721 A1*   5/2011    Enomoto .......... G02F 1/133536
                                                      349/137

FOREIGN PATENT DOCUMENTS

| JP | 2007-333818 | 12/2007 |
| KR | 10-2012-0093003 | 8/2012 |
| KR | 10-2014-0020120 | 2/2014 |
| KR | 10-2014-0036461 | 3/2014 |
| KR | 10-2014-0043198 | 4/2014 |

* cited by examiner

*Primary Examiner* — Richard Kim
(74) *Attorney, Agent, or Firm* — H.C. Park & Associates, PLC

(57) ABSTRACT

A curved liquid crystal display includes: a first region including a first color pixel area, a second color pixel area, a third color pixel area, and a white pixel area; and a second region excluding the first region, the second region including the first color pixel area, the second color pixel area, and the third color pixel area. The curved liquid crystal display includes: a first substrate and a second substrate that are bent, and a liquid crystal layer is disposed between the first substrate and the second substrate.

20 Claims, 15 Drawing Sheets

CURVED LIQUID CRYSTAL DISPLAY DEVICE

CROSS-REFERENCE TO RELATED APPLICATION

This application claims priority from and the benefit of Korean Patent Application No. 10-2015-0009498, filed on Jan. 20, 2015, which is hereby incorporated by reference for all purposes as if fully set forth herein.

BACKGROUND

Field

Exemplary embodiments relate to a curved liquid crystal display. More particularly, exemplary embodiments relate to a curved liquid crystal display having improved transmittance.

Discussion of the Background

A liquid crystal display, which is a widely used flat panel display, includes two display panels, on which electric field generating electrodes including a pixel electrode and a common electrode are formed, and a liquid crystal layer inserted therebetween. The liquid crystal display displays an image by generating an electric field on a liquid crystal layer from a voltage applied to the electric field generating electrodes, determining alignments of liquid crystal molecules of the liquid crystal layer through the generated electric field, and controlling polarization of incident light.

The two sheets of display panels in the liquid crystal display may include a thin film transistor array panel and an opposing display panel. The thin film transistor array panel includes a gate line transferring a gate signal, a data line transferring a data signal crossing the gate signal, a thin film transistor connected with the gate line and the data line, a pixel electrode connected with the thin film transistor, and the like. A light blocking member, a color filter, and a common electrode may be disposed on the opposing display panel. The light blocking member, the color filter, and the common electrode may be formed on the thin film transistor array panel.

The liquid crystal displays have become wider and curved to enhance a viewer's immersive experience.

The curved liquid crystal display may be manufactured by disposing the components on two display panels, attaching the display panels together to form a flat-panel liquid crystal display, and then bending it. During this process, the two display panels may be misaligned from each other, thereby generating texture and reducing transmittance.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a curved liquid crystal display for improving transmittance.

Additional aspects will be set forth in the detailed description which follows, and, in part, will be apparent from the disclosure, or may be learned by practice of the inventive concept.

An exemplary embodiment discloses a curved liquid crystal display including: a first region including a first color pixel area, a second color pixel area, a third color pixel area, and a white pixel area; and a second region excluding the first region, the second region including the first color pixel area, the second color pixel area, and the third color pixel area, wherein the curved liquid crystal display includes: a first substrate and a second substrate that are bent; and a liquid crystal layer disposed between the first substrate and the second substrate.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
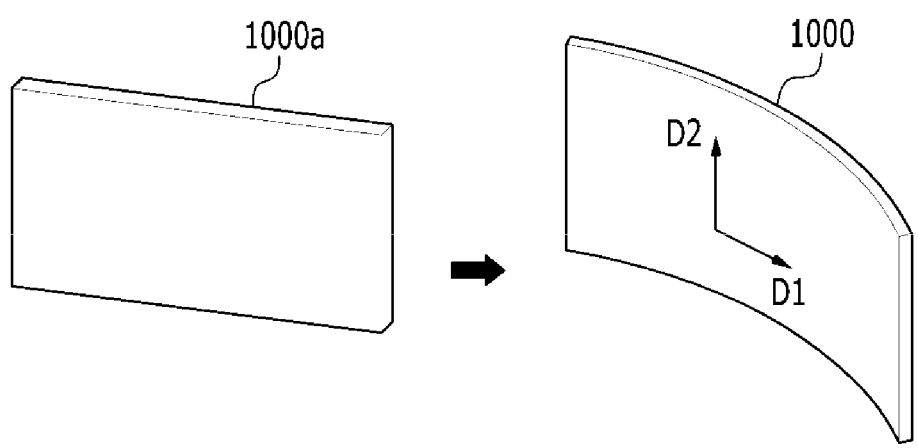
FIG. 1 shows a perspective view of a process for forming a curved liquid crystal display according to one or more exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

A curved liquid crystal display according to one or more exemplary embodiments will be described with reference to FIGS. 1, 2, 3, 4, 5, 6, and 7.

Figure 2:
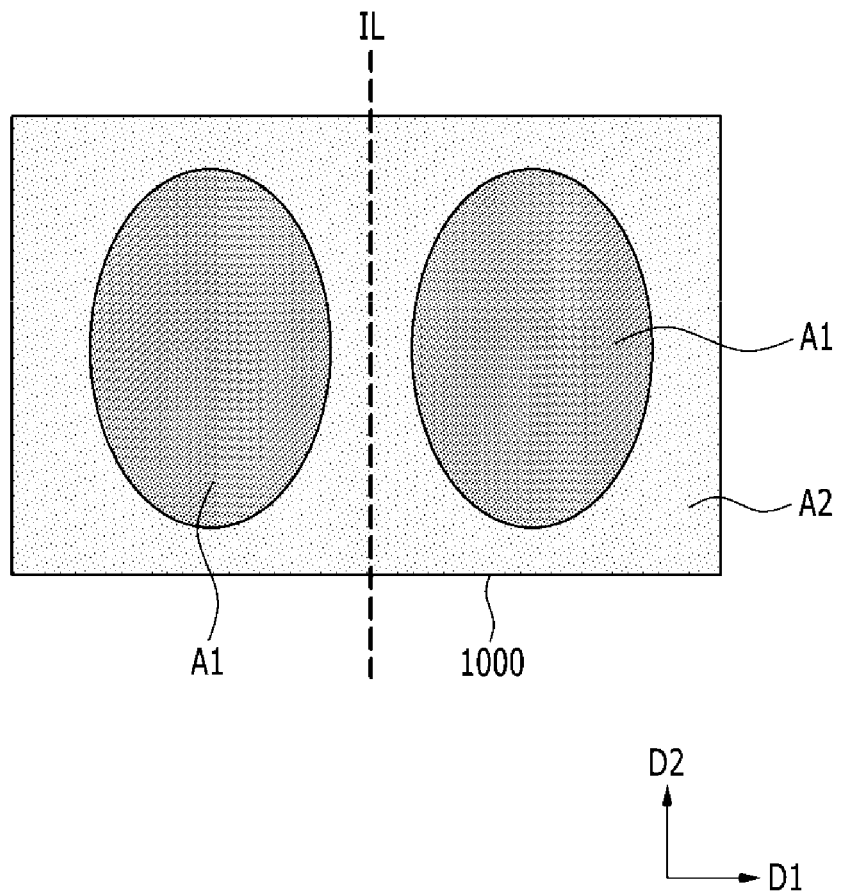
FIG. 2 shows a top plan view of a curved liquid crystal display according to one or more exemplary embodiments.
Figure 3:
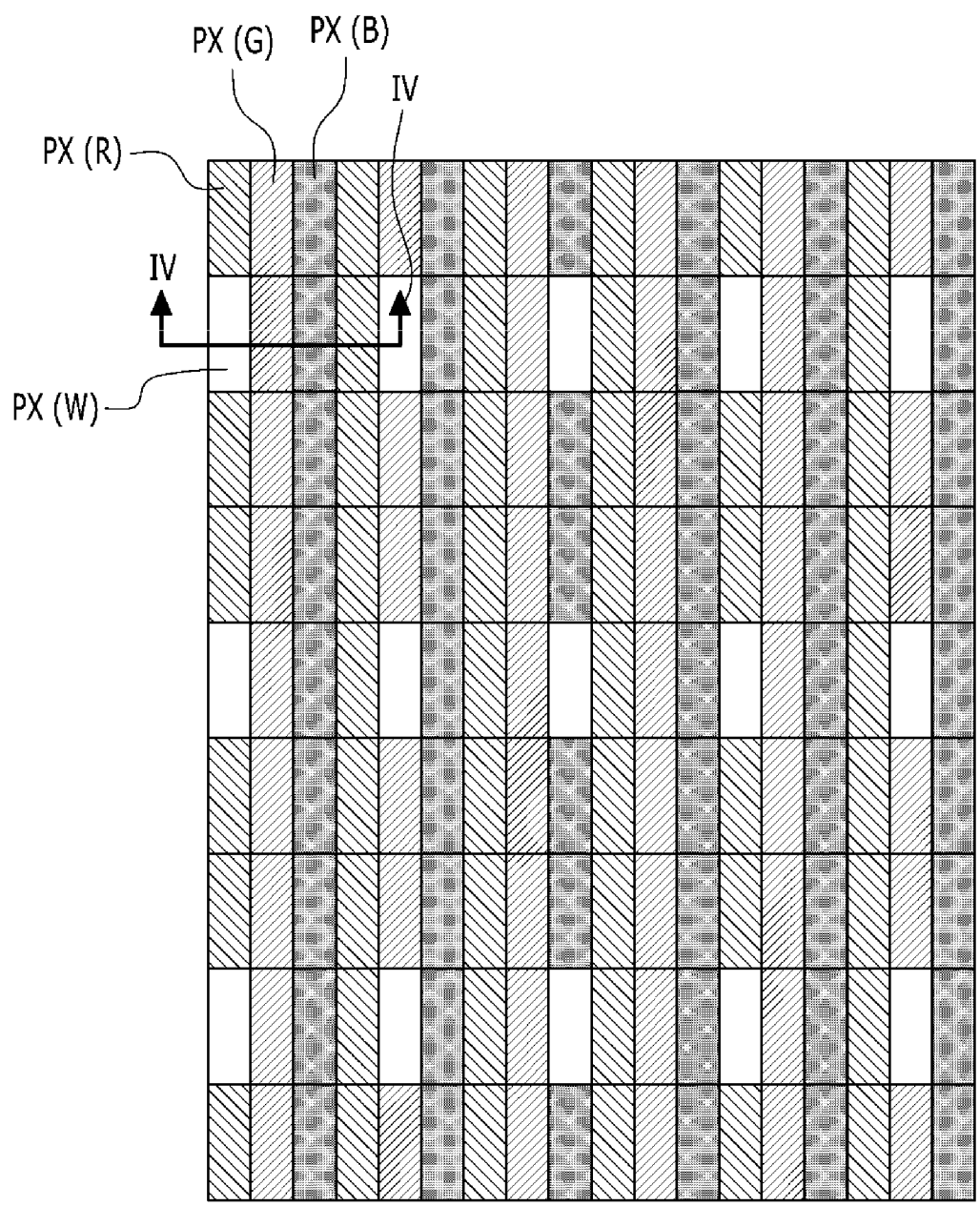
FIG. 3 shows a top plan view of a first region of a curved liquid crystal display according to one or more exemplary embodiments.
Figure 4:
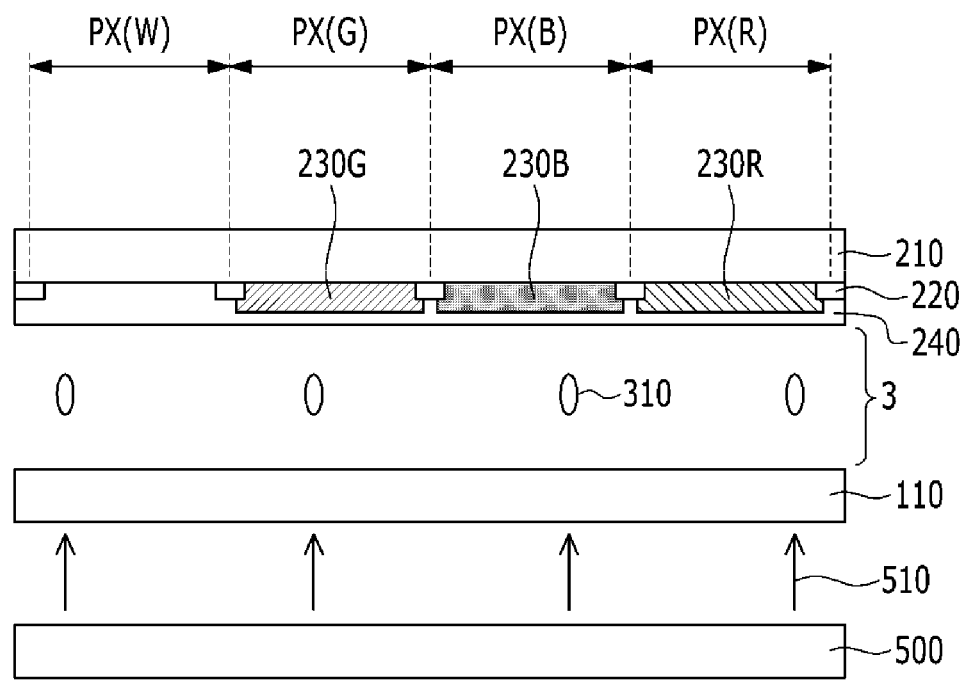
FIGS. 4 and 5 show cross-sectional views of a curved liquid crystal display taken along a sectional line IV-IV of FIG. 3, according to one or more exemplary embodiments.
Figure 5:
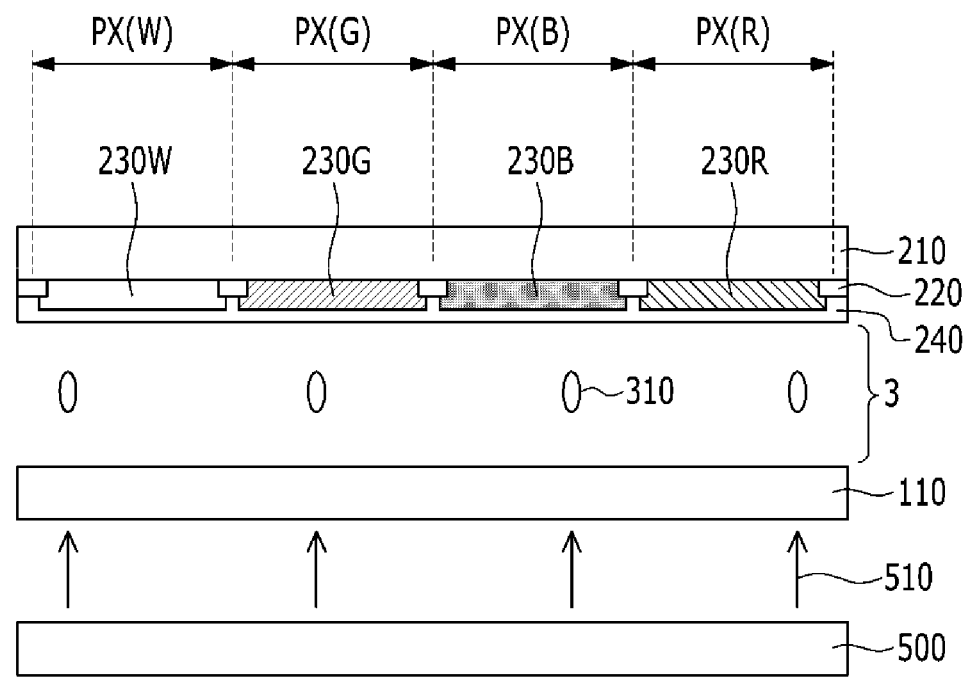
Figure 6:
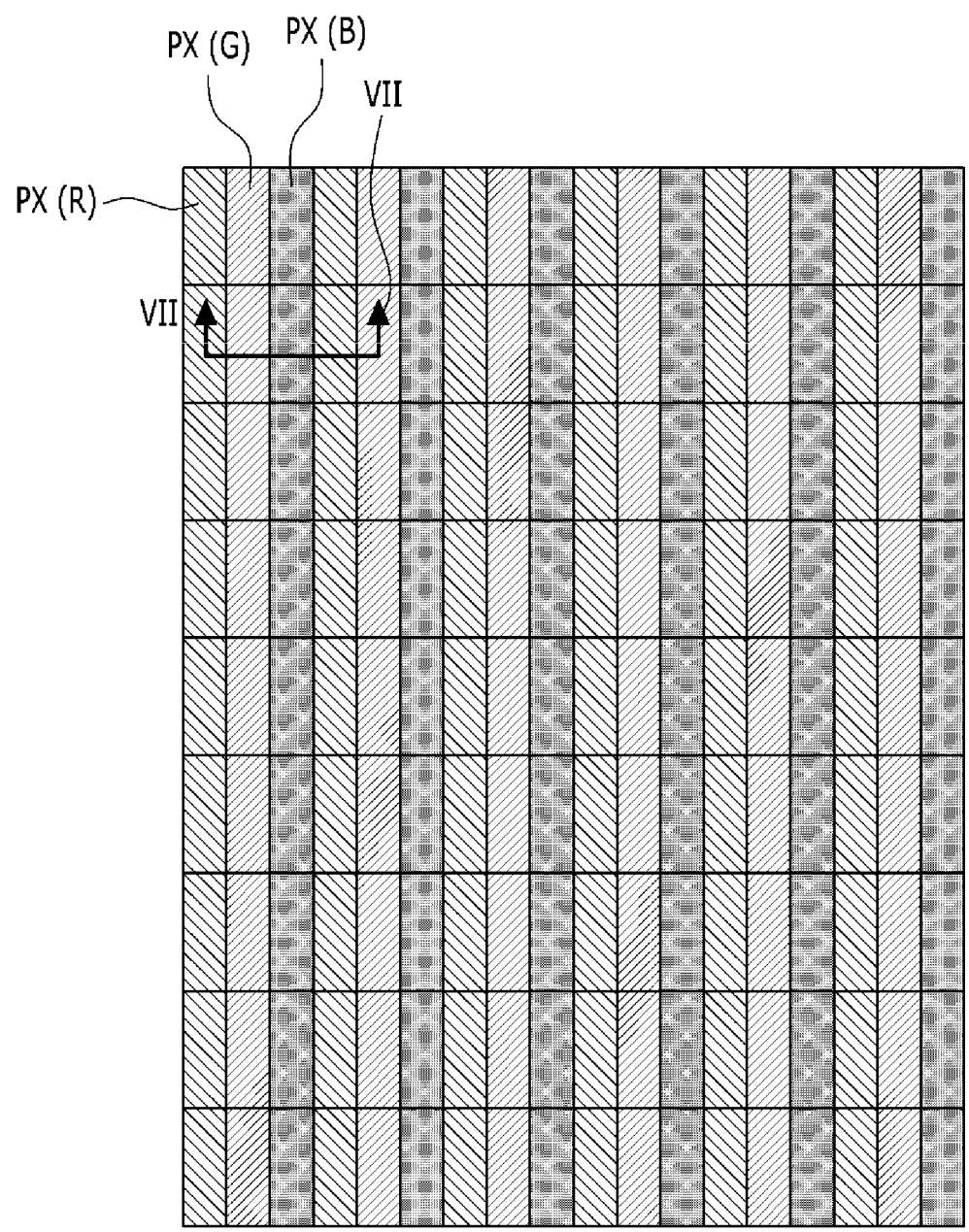
FIG. 6 shows a top plan view of a second region of a curved liquid crystal display according to one or more exemplary embodiments.
Figure 7:
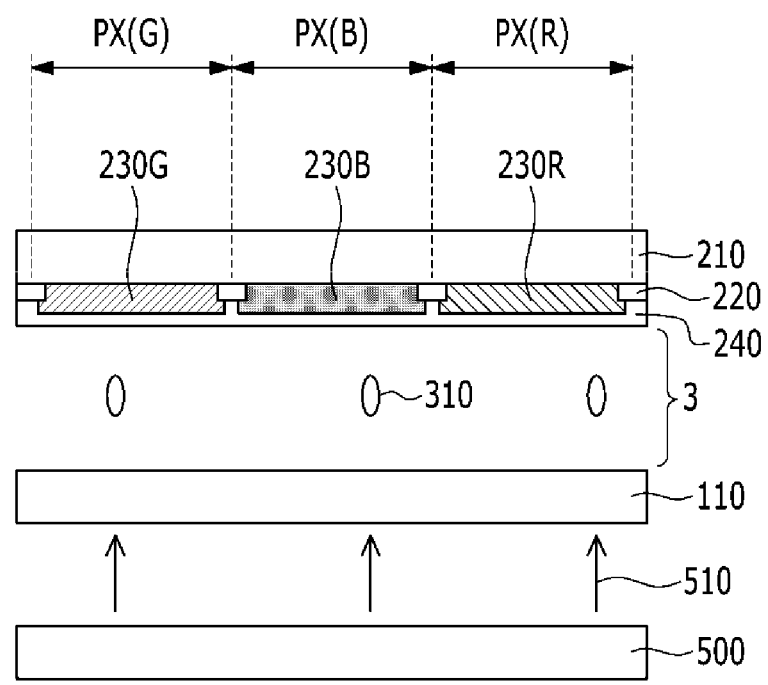
FIG. 7 shows a cross-sectional view of a curved liquid crystal display taken along a sectional line VII-VII of FIG. 6, according to one or more exemplary embodiments.

FIG. 1 shows a perspective view of a process for forming a curved liquid crystal display according to one or more exemplary embodiments, and FIG. 2 shows a top plan view of a curved liquid crystal display according to one or more exemplary embodiments. FIG. 3 shows a top plan view of a first region of a curved liquid crystal display according to one or more exemplary embodiments, and FIGS. 4 and 5 show cross-sectional views of a curved liquid crystal display taken along a sectional line IV-IV of FIG. 3, according to one or more exemplary embodiments. FIG. 6 shows a top plan view of a second region of a curved liquid crystal display according to one or more exemplary embodiments, and FIG. 7 shows a cross-sectional view of a curved liquid crystal display taken along a sectional line VII-VII of FIG. 6, according to one or more exemplary embodiments.

Referring to FIG. 1, the curved liquid crystal display 1000 is formed by manufacturing a flat liquid crystal display 1000a and bending the flat liquid crystal display 1000a.

The curved liquid crystal display 1000 may be bent to have a curvature. The curved liquid crystal display 1000 is bent relative to a first direction D1.

Regarding the flat liquid crystal display 1000a, the distance from the viewer's eye to a plurality of pixels included in the display device varies. For example, when the viewer's eye is located facing the center of the display device, the distance between the viewer's eye and pixels on the left and right edges of a flat display device may be longer than the distance between the viewer's eye and pixels at the center of the flat-panel display device. In the curve liquid crystal display 1000 according to one or more exemplary embodiments, the distance from the viewer's eye to all of the plurality of pixels may be maintained nearly constant, provided that the viewer's eye is located at the center of a circle formed by extending the curve. The curved liquid crystal display may provide a wider viewing angle than flat-panel display devices, photoreceptor cells of the viewer's eye may be stimulated by more information, and more visual information may be sent to the brain through optic nerves of the viewer. Accordingly, the viewer may have increased sense of reality and immersive experience.

Referring to FIG. 2, the curved liquid crystal display 1000 includes a first region A1 and a second region A2.

Two first regions A1 are provided on one curved liquid crystal display 1000. Each of the two first regions A1 may be symmetrically disposed on respective sides with respect to an imaginary line IL provided on a center portion of the curved liquid crystal display 1000. The imaginary line IL extends in a second direction D2 perpendicular to the first direction D1. The first region A1 may have a circle shape or an oval shape.

The second region A2 is a region of the curved liquid crystal display 1000 excluding the first region A1. The second region A2 surrounds the first region A1.

The flat liquid crystal display 1000a includes two display panels including various components, respectively. The two display panels may be misaligned during the process of bending the flat liquid crystal display 1000a to form the curved liquid crystal display 1000. The first region A1 indicates a portion of the curved liquid crystal display 1000 that may have a relatively higher probability of panel misalignment occurring. Edges of the two display panels of the curved liquid crystal display 1000 are affixed by a sealant so they have a relatively lower probability of misalignments occurring. The misalignment occurs relatively less at the portion of the curved liquid crystal display 1000 where the imaginary line IL is provided. Relatively more misalignments may be generated toward the center portion of the first regions A1.

Referring to FIG. 3 and FIG. 4, the curved liquid crystal display 1000 includes a first substrate 110 and a second substrate 210 disposed facing each other, and a liquid crystal layer 3 disposed between the first substrate 110 and the second substrate 210.

The first substrate 110 and the second substrate 210 may be made of glass and/or plastic. The liquid crystal layer 3 may include a plurality of liquid crystal molecules 310 and may be a positive or a negative type.

Although not shown, a field generating electrode such as a pixel electrode and a common electrode may be formed on the first substrate 110 and the second substrate 210. When a voltage is applied to the field generating electrode, an electric field is generated on the liquid crystal layer 3 to control a direction of the liquid crystal molecules 310.

A light source 500 may be disposed on a rear side of the first substrate 110. The light source 500 may include a light emitting diode (LED), and the light source 500 may be configured to supply light beams 510. The electric field formed between the first substrate 110 and the second substrate 210 may control the direction of the liquid crystal molecules 310 of the liquid crystal layer 3, and the direction of the liquid crystal molecules 310 control the amount of light passing through the liquid crystal layer 3. A plurality of color filters 230R, 230G, and 230B are disposed on the second substrate 210. According to exemplary embodiments, the color filters 230R, 230G, and 230B may alternately be disposed on the first substrate 110. The light that passed through the liquid crystal layer 3 may pass through the color filters 230R, 230G, and 230B and thus, light having a corresponding wavelength may be transmitted through and light having other wavelengths may be absorbed.

The first region A1 of the curved liquid crystal display according to one or more exemplary embodiments includes a plurality of pixel areas, and each of the plurality of pixel areas may include a first color pixel area PX(R), a second color pixel area PX(G), a third color pixel area PX(B), and a fourth color pixel area PX(W). The first color pixel area PX(R), the second color pixel area PX(G), and the third color pixel area PX(B) may respectively be configured to represent different colors, and a combination of the colors may be configured to represent white color. The fourth color pixel area PX(W) may express white color. For example, the first color pixel area PX(R) may be configured to represent red color, the second color pixel area PX(G) may be configured to represent green color, the third color pixel area PX(B) may be configured to represent blue color, and the fourth color pixel area PX(W) may be configured to represent white color.

However, the exemplary embodiments are not limited thereto, and the first color pixel area PX(R) may be configured to represent cyan color, the second color pixel area PX(G) may be configured to represent magenta color, the third color pixel area PX(B) may be configured to represent yellow color, and the fourth color pixel area PX(W) may be configured to represent white color.

The color filters 230R, 230G, and 230B are disposed on the second substrate 210 in the respective pixel areas. The first color filter 230R is disposed in the first color pixel area PX(R), the second color filter 230G is disposed in the second color pixel area PX(G), and the third color filter 230B is disposed in the third color pixel area PX(B). The first color filter 230R may include a red filter configured to transmit red light of the incident white light beams passed through the liquid crystal layer 3. The second color filter 230G may include a green filter configured to transmit green light of the incident white light beams passed through the liquid crystal layer 3. The third color filter 230B may include a blue filter configured to transmit blue light of the incident white light beams passed through the liquid crystal layer 3.

No color filter is disposed in the fourth color pixel area PX(W). Therefore, the white light may be represented by transmitting light having wavelengths in the visible ray region therethrough. However, the exemplary embodiments are not restricted thereto, and referring to FIG. 5, a white filter 230W may be disposed in the fourth color pixel area PX(W). The white filter 230W may include a transparent photoresist configured to transmit light having the wavelengths in the visible ray region therethrough.

Referring to FIG. 5, the first to fourth pixel areas PX(R), PX(G), PX(B), and PX(W) may be configured to have rectangular shapes including two short sides and two long sides. The first color filter 230R, the second color filter 230G, and the third color filter 230B respectively included in the first color pixel area PX(R), the second color pixel area PX(G), and the third color pixel area PX(B) may have rectangular shapes, and they may have shapes similar to the first to third pixel areas PX(R), PX(G), and PX(B), respectively. Referring to FIG. 5, the fourth color filter 230W included in the fourth color pixel area PX(W) may have a rectangular shape, and it may have a shape similar to the fourth pixel area PX(W).

A light blocking unit 220 may be disposed at boundaries between the first color pixel area PX(R), the second color pixel area PX(G), the third color pixel area PX(B), and the fourth color pixel area PX(W).

The light blocking unit 220 may prevent generation of unintended mixture of colors and/or leakage of light at the boundary between the plurality of pixel areas.

Referring to FIG. 4, an overcoat 240 may be disposed on the first color filter 230R, the second color filter 230G, the third color filter 230B, and the light blocking unit 220. Referring to FIG. 5, the overcoat 240 may be disposed on the first color filter 230R, the second color filter 230G, the third color filter 230B, the fourth color filter 230W, and the light blocking unit 220. The overcoat 240 may be configured to flatten an upper surface of the second substrate 210 facing the first substrate 110.

Referring to FIGS. 6 and 7, the second region A2 of the curved liquid crystal display includes a plurality of pixel areas which may include a first color pixel area PX(R), a second color pixel area PX(G), and a third color pixel area PX(B).

The first region A1 includes a fourth color pixel area PX(W) may express white color, and the second region A2 does not include a fourth color pixel area PX(W). The first region A1 may have reduced transmittance from a misalignment of the first substrate 110 and the second substrate 210 in the process for manufacturing a curved liquid crystal display. The first region A1 may include a fourth color pixel area PX(W), and the first region A1 may have an increased luminance and compensate for the reduced transmittance.

Referring to FIG. 3, a ratio of the fourth color pixel area PX(W) to a sum of the color pixel areas, including the first color pixel area PX(R), the second color pixel area PX(G), the third color pixel area PX(B), and the fourth color pixel area PX(W), is substantially 1/12 in the first region A1. However, exemplary embodiments are not limited thereto. A curved liquid crystal display according to exemplary embodiments may have various ratios of the fourth color pixel area PX(W) to the sum of the color pixel areas. A curved liquid crystal display having greater curvature may have decreased transmittance in the first region A1, and therefore, the curved liquid crystal display may have increased ratio of the fourth color pixel area PX(W) to the sum of the color pixel areas in the first region A1.

A curved liquid crystal display according to one or more exemplary embodiments will be described with reference to FIGS. 8, 9, 10, 11, 12, and 13.

The curved liquid crystal display shown in FIGS. 8, 9, 10, 11, 12, and 13 includes structure similar to the curved liquid crystal display described with reference to FIGS. 2, 3, 4, 5, 6, and 7, and therefore, the descriptions for similar structure will be omitted. The curved liquid crystal display according to FIGS. 8, 9, 10, 11, 12, and 13 may be different from the curved liquid crystal display according to FIGS. 2, 3, 4, 5, 6, and 7 in that the first region A1 includes a plurality of sub-regions A11, A12, and A13.

Figure 8:
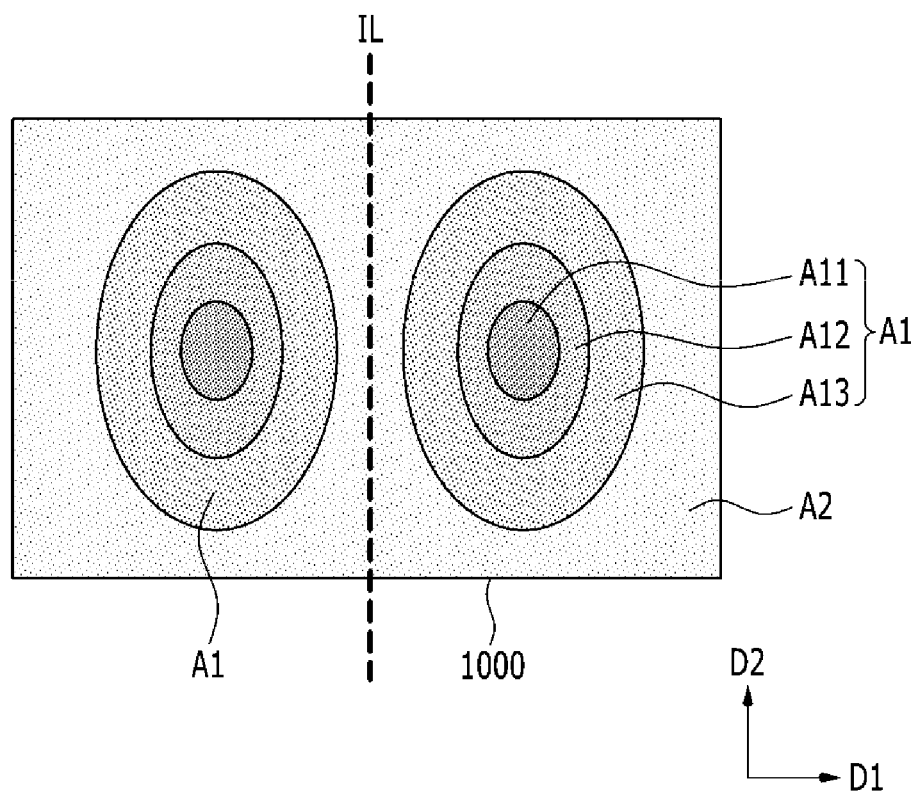
FIG. 8 shows a top plan view of a curved liquid crystal display according to one or more exemplary embodiments.
Figure 9:
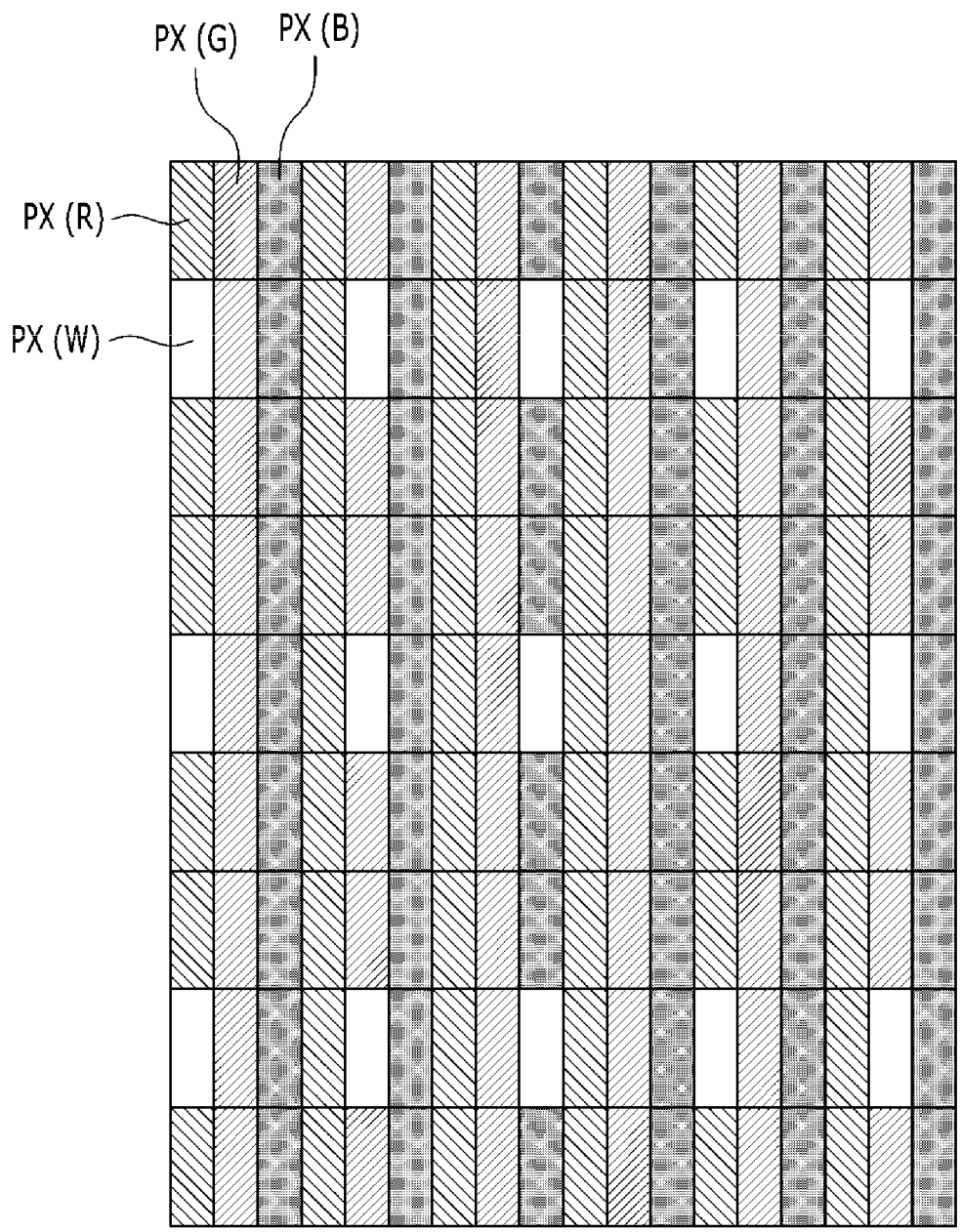
FIG. 9 shows a top plan view of a first sub-region of a first region of a curved liquid crystal display according to one or more exemplary embodiments.
Figure 10:
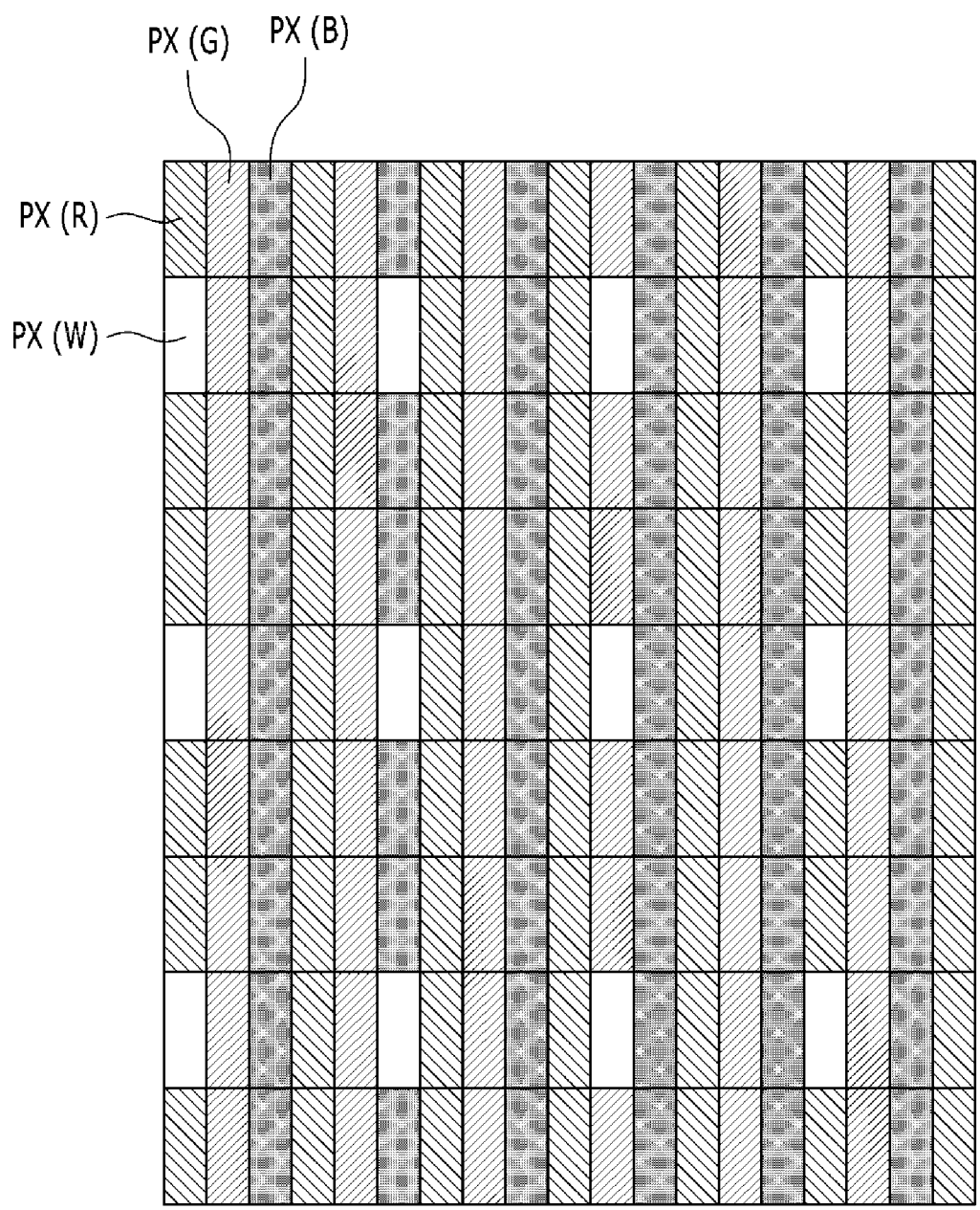
FIG. 10 shows a top plan view of a second sub-region of a first region of a curved liquid crystal display according to one or more exemplary embodiments.
Figure 11:
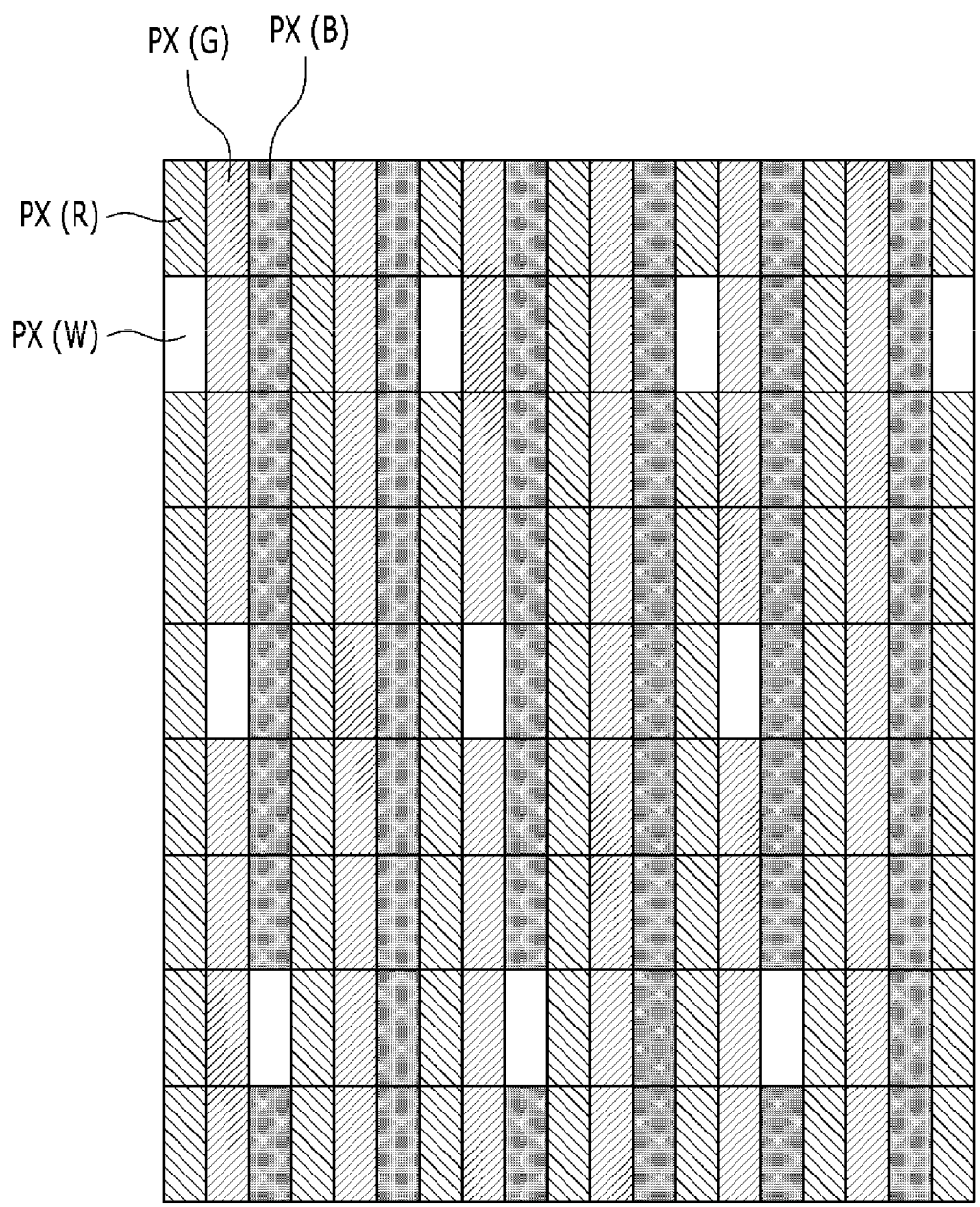
FIG. 11 shows a top plan view of a third sub-region of a first region of a curved liquid crystal display according to one or more exemplary embodiments.
Figure 12:
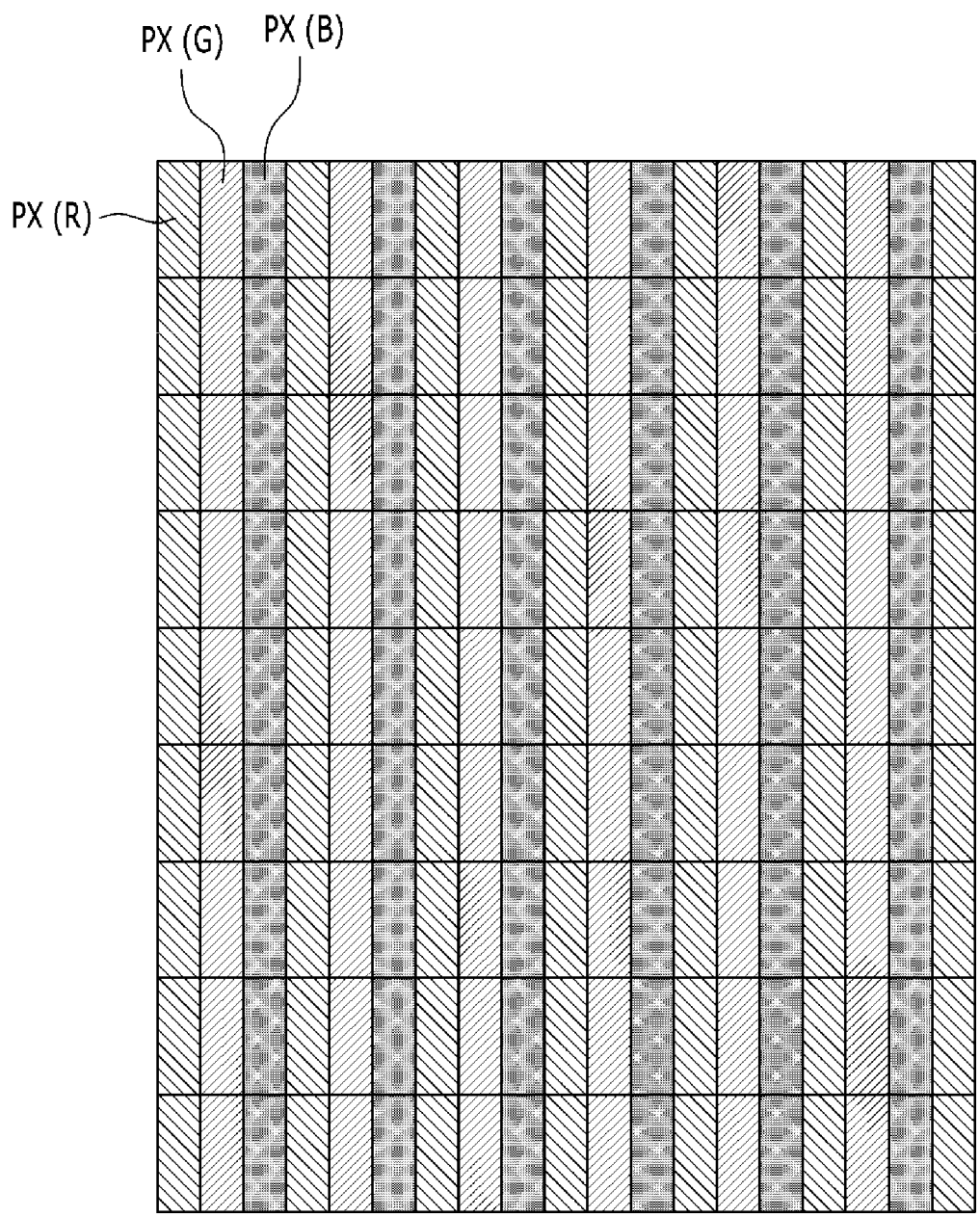
FIG. 12 shows a top plan view of a second region of a curved liquid crystal display according to one or more exemplary embodiments.
Figure 13:
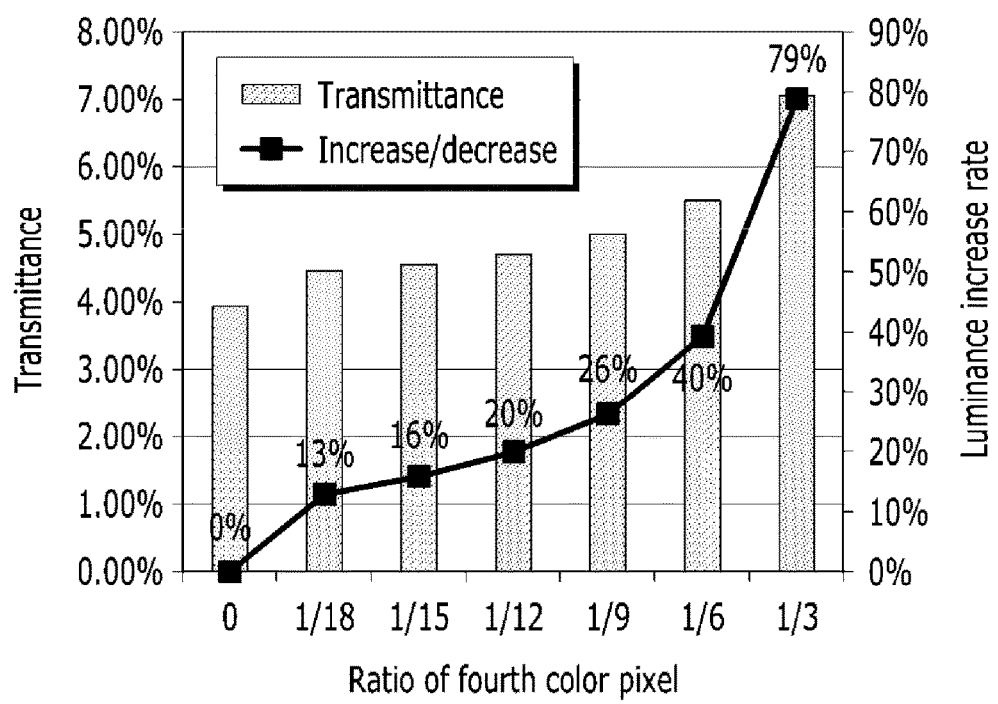
FIG. 13 shows a graph for indicating a variation of transmittance according to a ratio of a white pixel area.

FIG. 8 shows a top plan view of a curved liquid crystal display according to one or more exemplary embodiments, and FIG. 9 shows a top plan view of a first sub-region of a first region of a curved liquid crystal display according to one or more exemplary embodiments. FIG. 10 shows a top plan view of a second sub-region of a first region of a curved liquid crystal display according to one or more exemplary embodiments, and FIG. 11 shows a top plan view of a third sub-region of a first region of a curved liquid crystal display according to one or more exemplary embodiments. FIG. 12 shows a top plan view of a second region of a curved liquid crystal display according to one or more exemplary embodiments, and FIG. 13 shows a graph illustrating the transmittance according to a ratio of the fourth pixel area PX(W).

Referring to FIG. 8, the curved liquid crystal display 1000 includes a first region A1 and a second region A2. The first region A1 illustrated in FIG. 8 is divided into a plurality of sub-regions A11, A12, and A13, compared to the first region A1 illustrated in FIG. 2 is not divided into a plurality of sub-regions. Referring to FIG. 8, the first region A1 includes a first sub-region A11, a second sub-region A12, and a third sub-region A13. The first sub-region A11 is disposed in a center portion of first region A1. The second sub-region A12 is disposed surrounding the first sub-region A11, and the third sub-region A13 is disposed surrounding the second sub-region A12.

The first sub-region A11, the second sub-region A12, and the third sub-region A13 may have a circle shape or an oval shape.

The two display panels may be misaligned during the process of bending a flat liquid crystal display to form the curved liquid crystal display 1000. The first region A1 may have a relatively higher probability of panel misalignment occurring, and the sub-regions of the first region A1 may have a different probability of panel misalignment occurring. The first sub-region A11 may have a relatively highest probability that panel misalignment may occur, the second sub-region A12 may have a probability of panel misalignment less than that of the first sub-region A11, and the third sub-region A13 may have a probability of panel misalignment less than that of the second sub-region A12.

Referring to FIG. 8, the first region A1 is divided into three sub-regions A11, A12, and A13, but the exemplary embodiments are not limited thereto. The first region A1 may be divided into two or more sub-regions.

Referring to FIGS. 9, 10, and 11, the first sub-region A11, the second sub-region A12, and the third sub-region A13 of the first region A1 respectively include a first color pixel area PX(R), a second color pixel area PX(G), a third color pixel area PX(B), and a fourth color pixel area PX(W). Referring to FIG. 12, second region A2 includes the first color pixel area PX(R), the second color pixel area PX(G), and the third color pixel area PX(B). The second region A2 does not include the fourth color pixel area PX(W) configured to represent white light.

The ratios of the fourth color pixel area PX(W) to the sum of the color pixel areas in the first sub-region A11, the second sub-region A12, and the third sub-region A13 are different to each other.

Referring to FIG. 9, a ratio of the fourth color pixel area PX(W) to the sum of the color pixel areas, including the first color pixel area PX(R), the second color pixel area PX(G), the third color pixel area PX(B), and the fourth color pixel area PX(W), is substantially 1/12 in the first sub-region A11.

Referring to FIG. 10, the ratio of the fourth color pixel area PX(W) to the sum of the color pixel areas is substantially 1/15 in the second sub-region A12.

Referring to FIG. 11, the ratio of the fourth color pixel area PX(W) to the sum of the color pixel areas is substantially 1/18 in the third sub-region A13.

Therefore, the ratio of the fourth color pixel area PX(W) to the sum of the color pixel areas in the first sub-region A11 is greater than the ratio of the fourth color pixel area PX(W) to the sum of the color pixel areas in the second sub-region A12. The ratio of the fourth color pixel area PX(W) to the sum of the color pixel areas in the second sub-region A12 is greater than the ratio of the fourth color pixel area PX(W) to the sum of the color pixel areas in the third sub-region A13.

According to the exemplary embodiments, the ratios of the fourth color pixel area PX(W) to the sum of the color pixel areas in the respective sub-regions A11, A12, and A13 of the first region A1 may have various ratios.

A change of transmittance according to the ratio of the fourth color pixel area to the sum of the color pixel areas will be described with reference to Table 1 and FIG. 13.

Table 1 shows increase rates of transmittance and luminance according to a ratio of a fourth color pixel area, and FIG. 13 shows contents of Table 1 as a graph.

TABLE 1

| Ratios of fourth color pixel area to the sum of the color pixel areas | Transmittance (%) | Increase rates of luminance (%) |
|---|---|---|
| 0 | 3.95 | — |
| 1/18 | 4.47 | 13 |
| 1/15 | 4.58 | 16 |
| 1/12 | 4.73 | 20 |
| 1/9 | 4.99 | 26 |
| 1/6 | 5.52 | 40 |
| 1/3 | 7.08 | 79 |

Transmittance of 3.95%, when the fourth color pixel area is not included, may be set to a reference value. Here, the transmittance represents a percent rate of the amount of light having passed through the liquid crystal display to the amount of light coming out of a light source.

The fourth color pixel area is a white pixel area configured to transmit light with the wavelengths in the visible ray region, and therefore, the transmittance increases as the ratio of the fourth color pixel area to the sum of the color pixel areas increases.

In the curved liquid crystal display according to the exemplary embodiments, the two display panels are more likely to be misaligned in the first region A1 compared to the second region A2, and the transmittance may be compensated by adding the fourth color pixel area PX(W) to the first region A1. The probability that the misalignments of the two display panels may be different in the first sub-region A11, the second sub-region A12, and the third sub-region A13 of the first region A1, and therefore, a compensation of transmittance may be configured to be different by controlling the ratio of the fourth color pixel area to the sum of the color pixel areas.

A curved liquid crystal display according to one or more exemplary embodiments will be described with reference to FIG. 14.

The curved liquid crystal display according to one or more exemplary embodiments shown in FIG. 14 includes structure similar to the curved liquid crystal display described with reference to FIGS. 8, 9, 10, 11, 12, and 13, and therefore, the descriptions for similar structure will be omitted. The curved liquid crystal display illustrated in FIG. 14 includes first and second regions A1 and A2, and first to third sub-regions A11, A12, and A13 having shapes different from the curved liquid crystal display illustrated in FIG. 8, which will be described.

Figure 14:
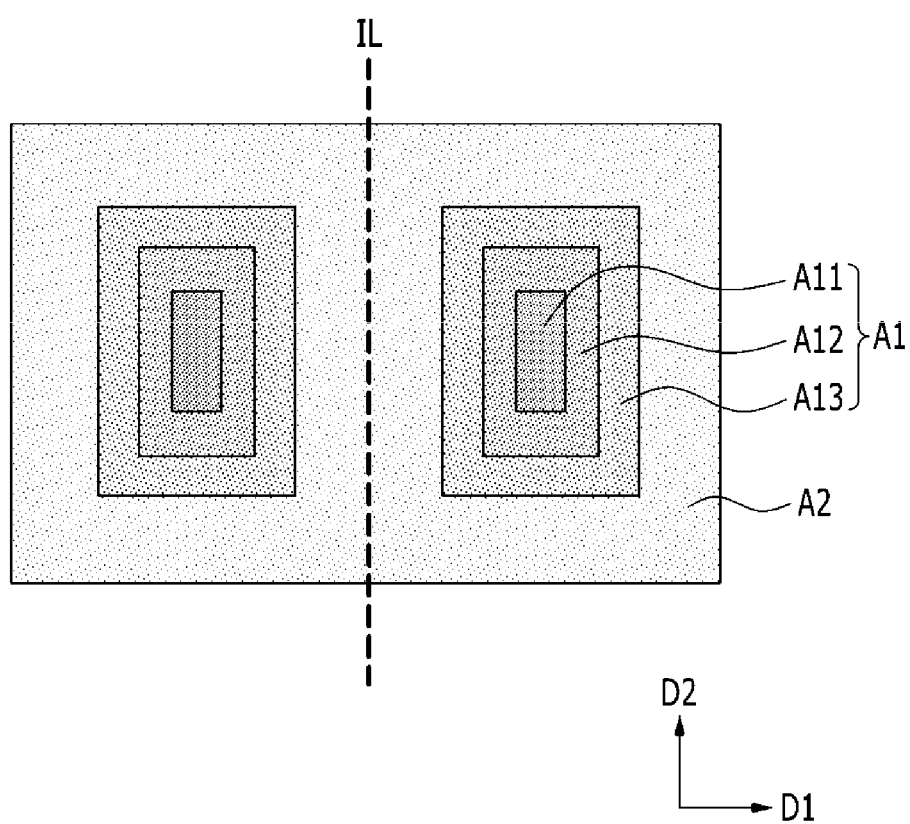
FIG. 14 shows a top plan view of a curved liquid crystal display according to one or more exemplary embodiments.

FIG. 14 shows a top plan view of a curved liquid crystal display according to one or more exemplary embodiments.

Referring to FIG. 14, the curved liquid crystal display 1000 according to one or more exemplary embodiments includes a first region A1 and a second region A2.

Compared to the first region A1 illustrated in FIG. 8, having a circle shape or an oval shape, the first region A1 illustrated in FIG. 14 may have a rectangular shape. However, the shape of the first region A1 is not limited thereto, and may have variable shapes.

The first region A1 may include a first sub-region A11, a second sub-region A12, and a third sub-region A13. The first sub-region A11, the second sub-region A12, and the third sub-region A13 may have rectangular shapes. The first sub-region A11, the second sub-region A12, and the third sub-region A13 may also have various shapes.

A second region of the curved liquid crystal display according to one or more exemplary embodiments will be described with reference to FIG. 15.

The curved liquid crystal display according to one or more exemplary embodiments shown in FIG. 15 includes structure similar to the curved liquid crystal display described with reference to FIG. 12, and therefore, the descriptions for similar structure will be omitted. The second region A2 illustrated in FIG. 15 includes the fourth color pixel area PX(W), compared to the second region A2 illustrated in FIG. 12, which does not include the fourth color pixel area PX(W).

Figure 15:
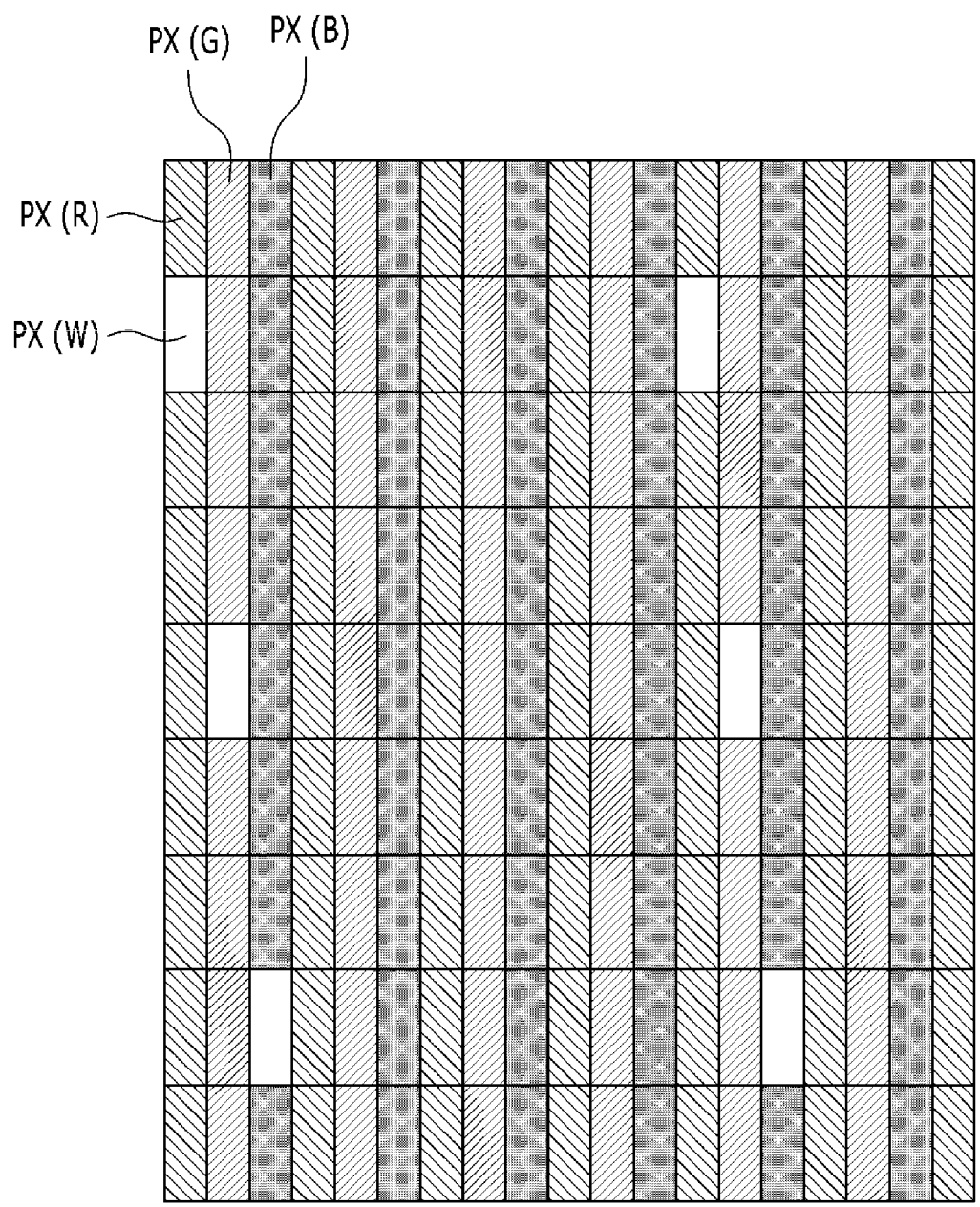
FIG. 15 shows a top plan view of a second region of a curved liquid crystal display according to one or more exemplary embodiments.

FIG. 15 shows a top plan view of a second region of a curved liquid crystal display according to one or more exemplary embodiments.

The second region includes no fourth color pixel area in the previous exemplary embodiment, and the second region A2 includes the fourth color pixel area PX(W) in the present exemplary embodiment.

The first region A1 and the second region A2 of the curved liquid crystal display according to one or more exemplary embodiments respectively include a first color pixel area PX(R), a second color pixel area PX(G), a third color pixel area PX(B), and a fourth color pixel area PX(W).

The first region A1 and the second region A2 include the fourth color pixel area PX(W), and therefore, the transmittance of the curved liquid crystal display may be improved as a whole.

In the second region A2, the ratio of the fourth color pixel area PX(W) to the sum of the color pixel areas, including first color pixel area PX(R), the second color pixel area PX(G), the third color pixel area PX(B), and the fourth color pixel area PX(W), is substantially 1/36.

The ratio of the fourth color pixel area PX(W) to the sum of the color pixel areas in the first region A1 is greater than the ratio of the fourth color pixel area PX(W) to the sum of the color pixel areas in the second region A2. The increased ratio of the fourth color pixel area PX(W) to the sum of the color pixel areas in the first region A1 may compensate the decreased transmittance within the first region A1. The ratio of the fourth color pixel area PX(W) to the sum of the color pixel areas in the second region A2 is not limited thereto, and may have various values.

The curved liquid crystal display may have increased transmittance by including a white pixel area.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A curved liquid crystal display comprising a display region consisting:
   a first region comprising a first color pixel area, a second color pixel area, a third color pixel area, and a white pixel area; and
   a second region surrounding the first region, the second region comprising the first color pixel area, the second color pixel area, and the third color pixel area,
   wherein the curved liquid crystal display comprises:
      a first substrate and a second substrate that are bent; and
      a liquid crystal layer disposed between the first substrate and the second substrate, and
   wherein the second region is free of the white pixel area.
2. The curved liquid crystal display of claim 1, wherein the first region comprises two first regions symmetrically disposed on respective sides of the curved crystal display with respect to an imaginary line disposed on a center of the curved liquid crystal display.

3. The curved liquid crystal display of claim 2, wherein the curved liquid crystal display is bent relative to a first direction, and
the imaginary line extends in a second direction perpendicular to the first direction.

4. The curved liquid crystal display of claim 1, wherein the first region comprises a plurality of sub-regions, and the plurality of sub-regions respectively comprise the first color pixel area, the second color pixel area, the third color pixel area, and the white pixel area.

5. The curved liquid crystal display of claim 4, wherein each of the plurality of sub-regions respectively have ratios of the white pixel area to a sum of the color pixel areas that are different from each other, and
the sum of the color pixel areas comprises the first color pixel area, the second color pixel area, the third color pixel area, and the white pixel area.

6. The curved liquid crystal display of claim 1, wherein the first region comprises:
a first sub-region disposed on a center portion of the first region;
a second sub-region disposed surrounding the first sub-region; and
a third sub-region disposed surrounding the second sub-region,
wherein the first sub-region, the second sub-region, and the third sub-region respectively comprise the first color pixel area, the second color pixel area, the third color pixel area, and the white pixel area.

7. The curved liquid crystal display of claim 6, wherein a ratio of the white pixel area to the sum of the color pixel areas in the first sub-region is greater than a ratio of the white pixel area to the sum of the color pixel areas in the second sub-region, and
a ratio of the white pixel area to the sum of the color pixel areas in the second sub-region is greater than a ratio of the white pixel area to the sum of the color pixel areas in the third sub-region.

8. The curved liquid crystal display of claim 6, wherein a ratio of the white pixel area to the sum of the color pixel areas is $1/12$ in the first sub-region.

9. The curved liquid crystal display of claim 8, wherein a ratio of the white pixel area to the sum of the color pixel areas is $1/15$ in the second sub-region.

10. The curved liquid crystal display of claim 9, wherein a ratio of the white pixel area to the sum of the color pixel areas is $1/18$ in the third sub-region.

11. The curved liquid crystal display of claim 1, wherein the first region has a shape selected from a group consisting of a circular shape, an oval shape, and a rectangular shape.

12. The curved liquid crystal display of claim 11, wherein the first region comprises a plurality of sub-regions, and the sub-regions have a shape selected from a group consisting of a circular shape, an oval shape, and a rectangular shape.

13. The curved liquid crystal display of claim 1, further comprising:
a first color filter disposed in the first color pixel area;
a second color filter disposed in the second color pixel area; and
a third color filter disposed in the third color pixel area.

14. The curved liquid crystal display of claim 13, further comprising a white filter disposed in the white pixel area.

15. The curved liquid crystal display of claim 13, further comprising an overcoat disposed on the first color filter, the second color filter, and the third color filter.

16. The curved liquid crystal display of claim 1, wherein the second region further comprises the white pixel area, and
a ratio of the white pixel area to the sum of the color pixel areas in the first region is greater than a ratio of the white pixel area to the sum of the color pixel areas in the second region.

17. The curved liquid crystal display of claim 16, wherein the first region comprises two first regions symmetrically disposed on respective sides of the curved liquid crystal display with respect to an imaginary line disposed on a center of the curved liquid crystal display.

18. The curved liquid crystal display of claim 17, wherein the first substrate and the second substrate are bent relative to a first direction, and
the imaginary line extends in a second direction perpendicular to the first direction.

19. The curved liquid crystal display of claim 16, wherein the first region comprises a plurality of sub-regions, and the plurality of sub-regions respectively comprise the first color pixel area, the second color pixel area, the third color pixel area, and the white pixel area.

20. The curved liquid crystal display of claim 19, wherein each of the plurality of sub-regions respectively have ratios of the white pixel area to a sum of the color pixel areas that are different from each other, and
the sum of the color pixel areas comprises the first color pixel area, the second color pixel area, the third color pixel area, and the white pixel area.

* * * * *